INVENTOR
Heinz Wilhelm Purnhagen
BY Spencer & Kaye
ATTORNEYS

United States Patent Office 3,460,059
Patented Aug. 5, 1969

3,460,059
CIRCUIT ARRANGEMENT FOR ECHO SOUNDERS
Heinz Wilhelm Purnhagen, Bremen, Germany, assignor to Fried. Krupp Gesellschaft mit beschrankter Haftung, Essen, Germany
Filed Aug. 12, 1968, Ser. No. 751,874
Claims priority, application Germany, Aug. 12, 1967, B 93,957
Int. Cl. G01s 9/66
U.S. Cl. 340—3      6 Claims

ABSTRACT OF THE DISCLOSURE

Circuit arrangement for an echo sounding device including an echo signal recording means, an amplifier connected to such recording means for controlling the same and a tripping stage circuit connected in parallel with such amplifier. The tripping stage circuit forms a reference voltage corresponding to the mean value of the peak echo signal amplitudes received over several sounding cycles. A fraction of such reference voltage is fed to a comparison circuit together with a voltage corresponding to an instantaneous echo signal amplitude. If the instantaneous signal voltage exceeds said fraction of the reference voltage a signal is emitted from the comparison circuit to a multivibrator circuit. The latter in turn, signals the amplifier which responds by controlling the intensity with which the instantaneous echo voltage which exceeded the said fraction of the reference echo voltage is recorded.

BACKGROUND OF THE INVENTION

The present invention relates to echo sounder devices and, more particularly, to a circuit arrangement for regulating the threshold of a tripping signal used in the recording operation.

The recording means of sounder devices are used to record echoes received from both fish and the floor or bottom of the body of water. Such echo sounder devices often include a circuit arrangement which effects the degree of the intensity of the recording of an echo signal exceeding a tripping threshold. The circuit arrangement provides an indication of fish and bottom echoes which are in marked contrast to each other. This is accomplished by providing that the higher amplitude bottom echoes are recorded, when exceeding the tripping threshold, by e.g. visibly less dark indications than echoes received from fish. The present invention is a circuit arrangement which affects the tripping threshold in order to obtain the best possible value of this threshold. This is accomplished by providing that the tripping threshold is automatically adapted to the varying magnitude of the echoes received from the bottom of the body of water.

Heretofore, it has been known to provide a permanently set tripping threshold for such devices. This method, however, has the disadvantage that the tripping threshold can not be adapted to the varying conditions under which soundings are usually performed. Such varying conditions, which are most often encountered, include variations in the depth of the body of water and variations in the consistency and terrain of the floor of the body of water. Under these changing conditions it is not impossible that strong fish echoes may actuate the permanently set tripping threshold and provide an indication which can not be distinguished from bottom echoes. Therefore, a tripping threshold which is permanently set is not suitable under such conditions.

In another prior art circuit arrangement the setting of the tripping threshold is accomplished manually, as e.g. described in the German Patent No. 1,136,618. In an arrangement like that the observer can adapt the tripping threshold to the changing bottom echo amplitudes and can thus assure that the fish echoes are definitely separated from the bottom echoes. However, since sounding conditions often change very quickly, it is necessary to continuously monitor such conditions and make appropriate changes in the tripping threshold setting in order to receive optimum results. This, however, is quite difficult to accomplish, particularly, where deep sea fishing operations are involved, since the observer can not exclusively concentrate his attention on the echo sounder device but must also, simultaneously, perform many other tasks in the operation of the ship. Thus, it is necessary for the observer to attend to and operate the echo sounder only from time to time, rather than continuously.

SUMMARY OF THE INVENTION

It is the object of the present invention to make automatic the adjustment of the tripping threshold.

In brief, the present invention relates to a circuit arrangement for echo sounder devices for recording fish echoes above the bottom of a body of water. The circuit operates by blocking out a regularly repeated transmitting signal sent by the echo sounder and, where necessary, by employing a time-dependent amplification controlling means which relies of the dependence of echo amplitude on distance. The circuit is characterized by a branch circuit connected in parallel to the echo sounder amplifier. The branch circuit includes means for forming a reference voltage which corresponds to the mean of the echo signal amplitude peak values over several sounding cycles, and means for feeding a selected fraction of this voltage to a comparison circuit in the branch circuit. The branch circuit also includes means forming a voltage corresponding to the echo amplitude received at any given instant. The instantaneous voltage is also fed to the comparison circuit, which emits a signal to a multivibrator circuit whenever the instantaneous voltage representing a given echo amplitude exceeds the preset fraction of the mean representing peak echo amplitude values. The output pulse of the multivibrator circuit influences the output voltage of the writing amplifier and thus the degree of contrast or darkness with which the echo, which exceeds the tripping threshold, is recorded.

DESCRIPTION OF THE PREFERRED EMBODIMENT

Figure 1:
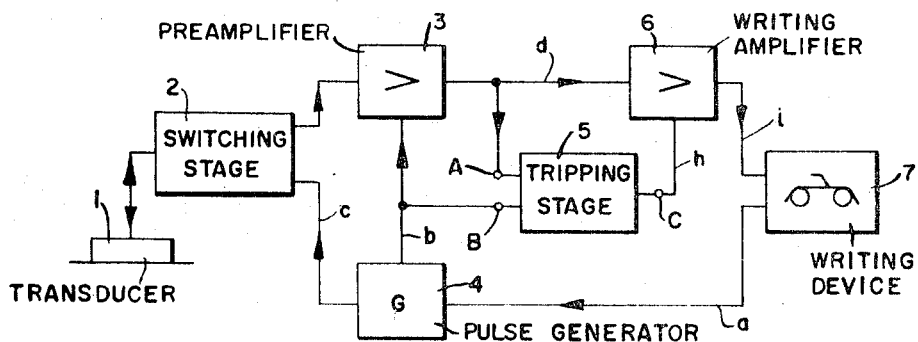
FIGURE 1 is a schematically shown circuit diagram of an echo sounding device.
Figure 2A:
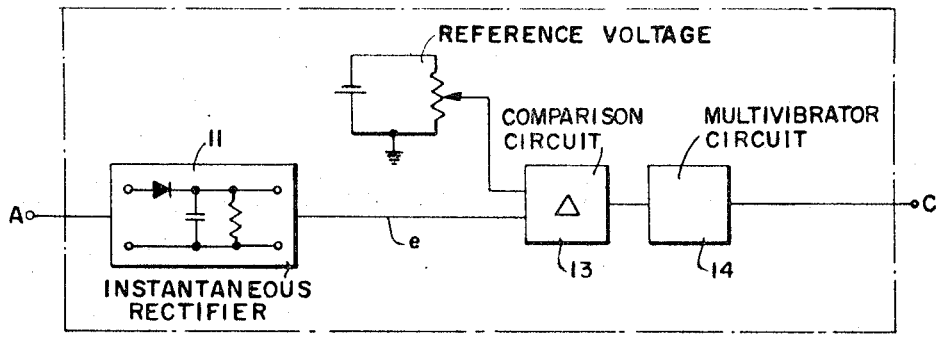
FIGURE 2a is a schematically shown circuit diagram of stage 5 of FIGURE 1, according to a prior art version of the tripping stage.

Referring to FIGURE 1, there is shown a block circuit diagram of a known echo sounding device. The device contains a sending and receiving transducer 1. This is connected, via a switching stage 2 to the pulse generator 4 and the preamplifier 3. The pulse generator 4 is triggered by pulses $a$ from the writing device 7 and emits keying pulses $b$ to the preamplifier 3 and to the circuit arrangement 5 during the interval the sounding pulses $c$ are sent by transducer 1. The sound waves emitted by transducer 1 travel through the water and are reflected from, for example, the bottom of the body of water. The echoes are received by transducer 1 and fed into preamplifier 3. The amplification of preamplifier 3 can be adjusted according to the echo strength. The keying pulse $b$ from pulse generator 4 is used to trigger the time dependent amplification control of preamplifier 3. The output signal $d$ of the preamplifier 3 is again amplified by the writing amplifier 6 and the output waveform $j$ is fed to writing device 7. Moreover, the output signal $d$ of preamplifier 3, simultaneously, serves as an input signal for the circuit arrangement or tripping stage 5, which is illustrated in detail in FIGURE 2a in a prior art version and in FIGURE 2b in a version according to the present invention. The prior art version of tripping stage 5, shown in FIGURE 2a, in contrast to the tripping stage 5 of FIGURE 2b, does not have, for example, a terminal B connection. The output signal $h$ of tripping stage 5 is fed to the writing amplifier 6 and there effects a visible change in the degree of darkness by which the echo which exceeds the tripping threshold is recorded.

Figure 2B:
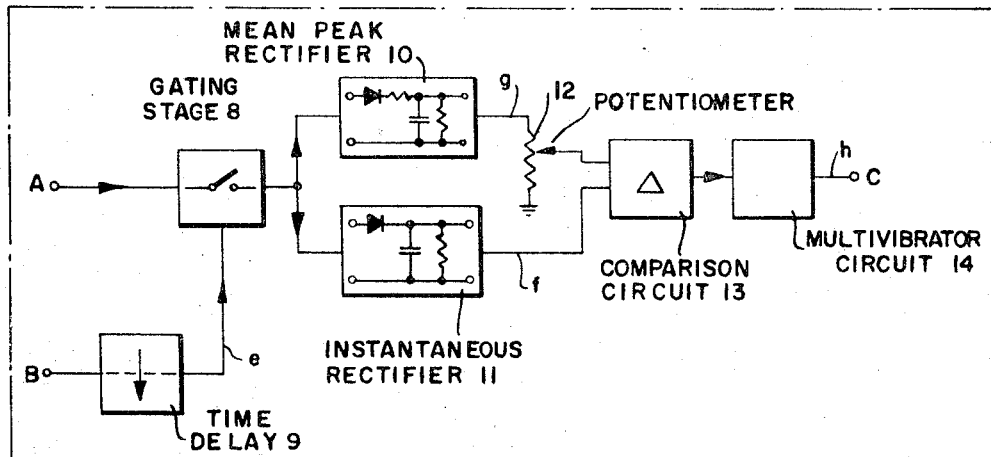
FIGURE 2b is a schematically shown circuit diagram of stage 5 of FIGURE 1, according to the present invention.
Figure 3:
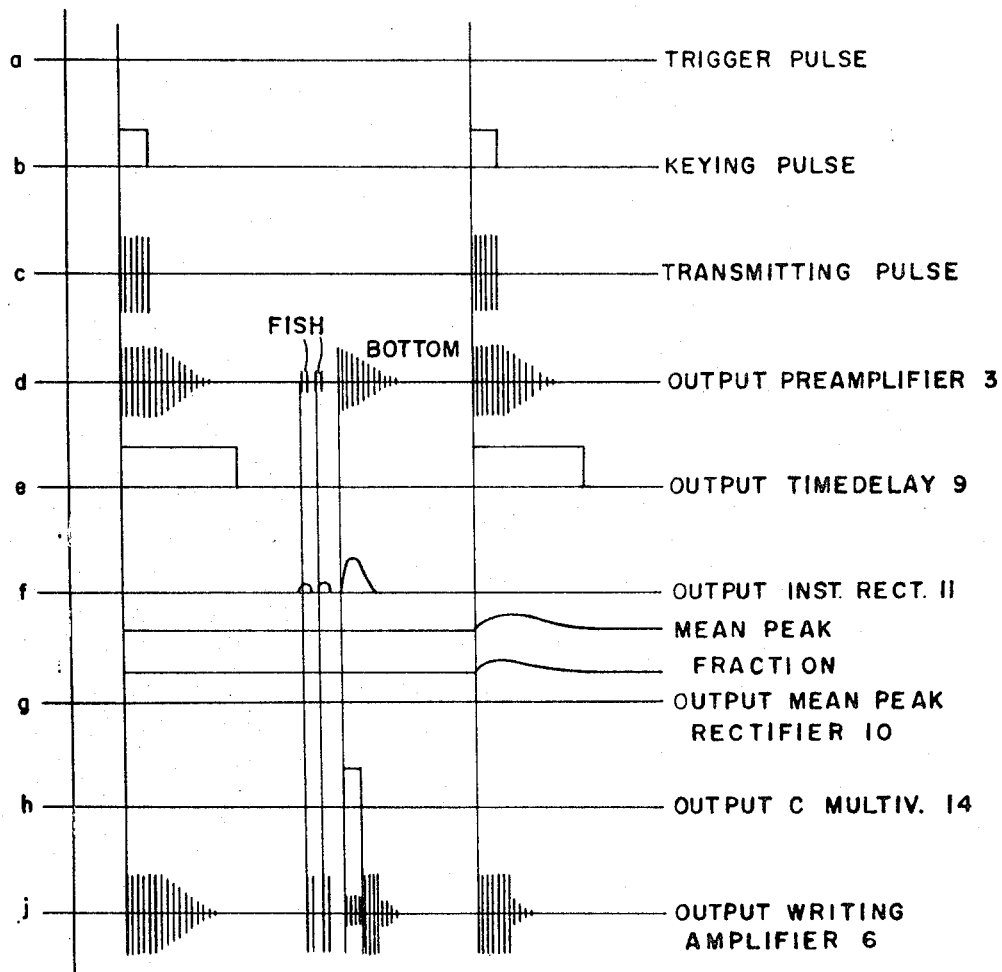
FIGURE 3 is a combined waveform diagram at different points indicated in FIGURES 1 and 2b.

Referring to FIGURE 2b, a block circuit diagram is shown of tripping stage 5, according to the present invention. Tripping stage 5, according to the present invention, provides a tripping threshold which adapts itself to the echo from the bottom of the body of water. The echo signal amplified in preamplifier 3 is fed via terminal A to switch or gating stage 8 which, during the interval a sounding pulse is being sent by transducer 1, is blocked by output pulse $f$ of the monostable multivibrator or time delay circuit 9 for a period of time which is somewhat longer than the interval of time the longest transmitting pulse $c$ lasts. This time delay circuit 9 is triggered by the keying pulse $b$ of generator 4. The gating stage 8 prevents any interference by the transmitting pulse and the subsequent zero-sound, the echo from the very vicinity of the transducer, with the formation of the mean value of the strongest or peak echo amplitudes in the peak value rectifier 10. Moreover, preamplifier 3 provides a time-dependent amplification control which is actuated by the keying pulse $b$ of generator 4 and compensates for the dependence of bottom echo amplitudes on distance. These two circuit elements guarantee that the bottom echo give the strongest input signal to the peak value rectifier 10. The peak value rectifier 10 has a high discharge time constant, as a consequence of which it can store the amplitudes of the strongest bottom echoes, registered during several sounding periods. The peak value rectifier 10 has a charge time constant of about 10 seconds, which is the same as the discharge time constant. This feature of the peak value rectifier 10 results in its output voltage $g$ approximately corresponding to the mean peak value of the bottom echo amplitudes, within the last 10 seconds.

Figure 4:
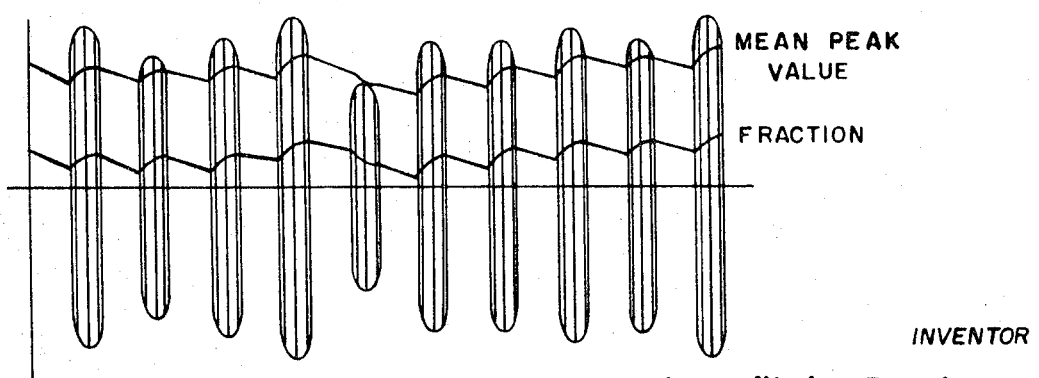
FIGURE 4 is a waveform illustration of peak echo amplitude signals received and a mean reference voltage derived therefrom, and a fraction of the mean voltage.

Referring to FIGURE 4, a waveform is thereshown, which illustrates peak amplitude signals received by the rectifier 10 over a span of ten seconds. A mean amplitude of the peak amplitude signals is also illustrated, as is a fractional portion of the mean amplitude.

The output voltage of gating stage 8 is, simultaneously, also the input voltage for the instantaneous value rectifier circuit 11. This circuit has relatively short charge and discharge time constants. Its output voltage $f$ is thus proportional to the bottom echo amplitude at any given instant.

In the comparison circuit 13, realized by a differential amplifier the output voltage $f$ of the rectifier 11 is compared with a fraction of the output voltage $g$ of rectifier 10 which fraction can be selected by means provided therefor, for example, potentiometer 12, and will be adjusted, e.g., to 20% of the mean peak value. If the voltage, which corresponds to the amplitude of the bottom echo signal received at any given instant, exceeds the fraction of the mean of the bottom echo amplitudes set by potentiometer 12, the comparison circuit 13 emits a signal. This signal causes a change in the switching state of multivibrator circuit 14 which serves as a means for providing a control signal to affect writing amplifier 6. During the time of circuit 14 is activated a signal $h$ is fed to writing amplifier 6, to limit its output voltage $i$ to provide a registration, by the recording means, of the echo exceeding the tripping threshold, for example, in a relatively less dark or gray tone. Moreover, since the tripping threshold adapts itself to the changing bottom echo amplitude signals, only the bottom echoes are recorded in gray, independently of such changing sounding conditions. The fish echo signals, however, are recorded, for example, in a relatively darker or black tone. Thus, the indications of fish echo signals are easily distinguishable from the indications of bottom echo signals even when the fish are situated very near to the bottom. A time delay circuit disposed in the writing amplifier 6 delays the echo signal by about 0.3 to 0.6 ms. and makes it possible to compensate, in a manner known per se, the time it takes for an echo from the bottom to rise to the point where it trips the tripping threshold. Thus, the leading edges, being the front line of the echo signal from the bottom, can be recorded with the same degree of darkness as the bottom echo, itself, and can, thus, be clearly distinguished from fish echo signals from the vicinity of the bottom.

In another embodiment of the circuit it would be possible to alter the contrast between indications. For example, the fish echo signals can be recorded in relatively gray tones and the bottom echo signals in relatively darker tones. The limiter in the writing amplifier 6 would here be normally effective and would be made ineffective only when the tripping threshold responds.

The present invention is not limited to the embodiment here described, but rather, it is definitely possible to achieve the same results and advantages with other circuit arrangements which operate in a similar way. It is thus possible, for example, to provide a polarized relay to take the place of the differential amplifier or comparison circuit 13. The graphic echo indication on the writing device 7 can be replaced, for navigation purposes, by a red light indicator in the form of an incandescent light bulb which rotates behind a circular scale. The limiter is here normally effective and becomes ineffective only when the multivibrator circuit 14 is actuated. This results in only the bottom echo signal being indicated. All other echo signals are suppressed. Thus, a simple and and absolute evaluation of the indication is possible.

The output signal of the multivibrator circuit 14 can also serve to indicate, on indicator elements connected to the echo sounder, the moment of arrival of the bottom echo signal. The tripping or output signal from multivibrator circuit 14 can be used, for example, as a stop pulse for a depth of the water body digital indicator. The digital indicator in such an arrangement can include, in the simplest case, a counter which receives the keying pulse of pulse generator 4, as a starting signal, and the output pulse of the multivibrator circuit 14 as a stopping signal. If the reference frequency fed into the counter has the value of half the speed of sound in water in meters per second, the depth of the water body is indicated directly in meters.

It will be understood that the above description of the present invention is susceptible to various modifications, changes, and adaptations.

I claim:
1. In a circuit arrangement for an echo sounding device which includes means for recording echo signals received from fish above the floor of a body of water by cutting out a regularly repeated sounding signal and, where necessary, using a time-dependent amplification controlling means, which relies on the dependence of echo amplitude on distance, and an amplifier connected to such recording means for controlling the same, the improvement wherein a tripping threshold branch circuit is connected in parallel to such amplifier, said branch circuit including:
(a) means for forming a reference voltage which corresponds to the mean value of the echo signal amplitude peaks, which are received over several sounding cycles;

(b) means for reducing said reference voltage to a predetermined fraction connected to said means (a);

(c) means for forming a voltage corresponding to the amplitude of an echo signal recieved at any given instance connected in parallel with said means (a);

(d) means for comparing said fraction of the reference voltage to said instantaneous voltage connected in series with both means (a) and means (b), said comparing means emitting a signal whenever the value of a given instantaneous voltage exceeds the value of said fraction of the reference voltage; and (e) means for providing a control signal which is connected to said comparing means for receiving said signal emitted by the comparing means, as a consequence of which, an output signal is emitted from the control signal means to affect the output voltage of the amplifier and thereby to control the intensity of the indication made by said recording means of said given instantaneous voltage which represents the echo signal that exceeded the tripping threshold.

2. Circuit arrangement as defined in claim 1 wherein said control signal means is a monostable multivibrator circuit which returns to a stable state after having been activated for a predetermined period of time.

3. Circuit arrangement as defined in claim 1 wherein said control signal means is a bistable multivibrator circuit which changes from a first to a second operating state when an input voltage exceeds a predetermined value and which changes from the second to the first operating state when the input voltage falls short of said predetermined value.

4. Circuit arrangement as defined in claim 3 including other indicator elements connected to the echo sounding device wherein said output signal from said multivibrator circuit means is applied to said other indicator elements.

5. Circuit arrangement as defined in claim 3 wherein time delay means are provided in said amplifier for delaying the output signal therefrom a period of time corresponding to the rise time of an echo signal from the floor of the body of water.

6. Circuit arrangement as defined in claim 1 wherein said means for reducing the reference voltage to a predetermined fraction is in the form of a potentiometer.

References Cited

UNITED STATES PATENTS 3,109,154 10/1963 Grada et al. _____ 340—3
3,383,650 5/1968 Drenkelfort _____ 340—3

RICHARD A. FARLEY, Primary Examiner

U.S. Cl. X.R.

343—7